United States Patent
Yahashi

(10) Patent No.: US 6,614,537 B1
(45) Date of Patent: Sep. 2, 2003

(54) MEASURING APPARATUS AND MEASURING METHOD

(75) Inventor: Akira Yahashi, Kobe (JP)

(73) Assignee: Minolta Co., Ltd., Osaka (JP)

( * ) Notice: Subject to any disclaimer, the term of this patent is extended or adjusted under 35 U.S.C. 154(b) by 260 days.

(21) Appl. No.: 09/684,622

(22) Filed: Oct. 10, 2000

(30) Foreign Application Priority Data

Oct. 14, 1999 (JP) .......................................... 11-292455

(51) Int. Cl.$^7$ .............................................. G01B 11/14
(52) U.S. Cl. ...................... 356/602; 356/608; 356/623; 356/3.04; 356/3.08
(58) Field of Search ................................ 356/601, 602, 356/606, 623, 613, 614, 622, 3.09, 3.1, 4.07, 5.1, 3.01; 250/559.22, 559.23, 559.31, 559.29; 382/165, 209, 224, 154

(56) References Cited

U.S. PATENT DOCUMENTS 5,848,188 A * 12/1998 Shibata et al. .............. 382/203
6,268,918 B1 * 7/2001 Tanabe et al. .............. 356/226
6,424,422 B1 * 7/2002 Kamon et al. .............. 356/623

FOREIGN PATENT DOCUMENTS

| JP | 5-336437 | 12/1993 |
|---|---|---|
| JP | 10-124646 | 5/1998 |

* cited by examiner

*Primary Examiner*—Hoa Q. Pham
(74) *Attorney, Agent, or Firm*—McDermott, Will & Emery

(57) ABSTRACT

Apparatus for obtaining three-dimensional shape data of an object including a controller for controlling a light beam, a scanning system for scanning an object by the controlled light beam, and an image receiving system for receiving the light reflected from the object in a prescribed range. A memory stores data for correction of illumination irregularities corresponding to positions in the prescribed range that the light reflected from the object is received, and the controller refers to the stored data according to the position where the reflected light is received by the image receiving system, in order to control the light beam used by the scanning system.

19 Claims, 11 Drawing Sheets

(A)

(B)

MEASURING APPARATUS AND MEASURING METHOD

RELATED APPLICATION

This application is based on Patent Application No. H11-292455 filed in Japan, the entire content of which is hereby incorporated by reference.

BACKGROUND OF THE INVENTION

1. Field of the Invention

The present invention relates to a measuring apparatus and measuring method, and specifically relates to a measuring apparatus and measuring method for measuring the three-dimensional shape of an object by scanning the object with light and receiving the light reflected from the object.

2. Description of the Related Art

The three-dimensional input apparatus of an optical system is an apparatus which outputs three-dimensional data or data based on such data representing the three-dimensional shape of an object based on a photographic image (slit image or spot image) from reflected light obtained by an image sensing element by projecting a slit light or spot light from a laser on the object.

The precision of the three-dimensional data is dependent on the signal strength of the photographic image formed on the image sensing element. When the signal strength is inappropriate, e.g., when the signal strength is too small and does not attain a value recognized as a reception signal, or when signal strength is too large so as to attain saturation, accurate three-dimensional data cannot be obtained.

One aspect of the image sensing element, for example, is that, if the image sensing conditions such as image sensing distance, exposure time, and circuit amplification and the like are constant, the signal strength at the center of the screen is approximately proportional to the intensity of the projected detection light. The signal strength of the image obtained by the image sensing element can be set at a suitable value by adjusting the intensity of the detection light.

Japanese Laid-Open Patent Application No. HEI 10-124646 discloses a method wherein a preliminary light is emitted at a specific intensity prior to three-dimensional measurement so as to set the image sensing conditions based on the signal intensity of the sensed slit image, and thereafter perform the main measurement. Japanese Laid-Open Patent Application No. HEI 7-23209 discloses a method wherein the amount of projection light is successively adjusted based on the measurement result of the total amount of light of a spot image formed on the photoreceptor surface of the image sensing element.

Disadvantages of the aforesaid conventional art are described below.

In the former method, for example, although an image of suitable signal strength may be obtained in the center of the screen, the signal strength at the edges of the screen may not necessarily be suitable.

In general, the light receiving lens produces different image plane illumination depending on the position within the image plane because such illumination is dependent on the optical characteristics of the lens, e.g., due to the existence of the cosine fourth law, and vignetting. In this case, "difference in image plane illumination" (in the presence of illumination irregularity) means that the value of the ultimately obtained signal differs depending on the position at which light enters due to the dependence on the optical characteristics of the light receiving lens and assuming light of equal intensity is projected to the image sensing system. When actually sensing light reflected by an object, the intensity of the received light will differ depending on the position within the screen in accordance with the shape and the like of the object (this allows the measurement of the shape of the object), but the image plane illumination invariably produces irregularities in the obtained signals assuming spot light of the same intensity enters the screen.

Specifically, when light passes through the light receiving lens and forms an image, the image plane illumination of the periphery of the light receiving area is reduced from the center area in accordance with the image plane illumination. That is, when a spot light is used as the detection light, the image plane illumination at the edges of the light receiving area may not be suitable even if the image plane illumination at the center area of the light receiving surface is suitable. Conversely, when image plane illumination is suitable at the edges of the light receiving surface, there may be saturation at the center area. Therefore, it may not be possible to obtain suitable signal strength over the entire screen.

In the latter method, the amount of received light is normally monitored, and the amount of light of the spot light is adjusted based on the monitor measurement result, so as to obtain a suitable signal strength at both the center area and the edges of the screen. However, since the amount of received light normally must be measured at high speed, a high-speed monitor element and high-speed feedback controls are required.

SUMMARY OF THE INVENTION

An object of the present invention is to eliminate the aforesaid disadvantages. Another object of the present invention is to provide suitable image illumination in all parts of the light receiving surface. Still another object of the present invention is to measure the shape of an object without requiring a high-speed photoreceptor element ore high-speed feedback controller.

These and other objects are attained by an apparatus for obtaining data relating to the three-dimensional shape of an object, said apparatus comprising: a controller for controlling a light beam; a scanning system for scanning an object by the controlled light beam; an image receiving system for receiving the light beam reflected from the object in a prescribed range; and a memory for storing data for correction of illumination irregularities corresponding to positions in said prescribed range, wherein the controller refers to the stored data according to the position where the reflected beam received by said image receiving system with referring to the stored data.

These objects of the present invention are attained by an apparatus for receiving the light reflected by an object, said apparatus comprising: a light source for emitting light; a deflecting mechanism for deflecting the emitted light to scan an object; a lens system for translate the light reflected by the object; a sensor for receiving the translated light; a memory for storing data dependent on an optical characteristics of the lens system; and a controller for controlling the emission of light in proportion to the deflection of light with referring to the data.

These objects of the present invention are attained by the aforesaid apparatus further comprising a range finder for measuring the distance from the apparatus to a point on the object, and wherein the controller refers the data corresponding to the measured distance.

The objects of the present invention are attained by a method for obtaining three-dimensional shape data of an object, said method comprising the steps of: emitting light; scanning an object with deflecting the emitted light in a predetermined range by a deflector; and receiving the light reflected from the object at light receiving positions along with the scanning of said scanning step, wherein the light emission of said emitting step is controlled in accordance with information representing a light receiving characteristics at each of the light receiving positions.

These objects of the present invention are attained by the aforesaid method further comprising:

a step of measuring the optical path length before aforesaid steps.

Image plane illumination ratio data D75, or other various forms of data may be used as data representing image plane illumination distribution. When image plane illumination ratio data D75 are used as image plane illumination distribution data, the spot light control means 61, for example, controls the intensity of the spot light and the image plane illumination ratio area so as to be constant.

The invention itself, together with further objects and attendant advantages, will be best understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
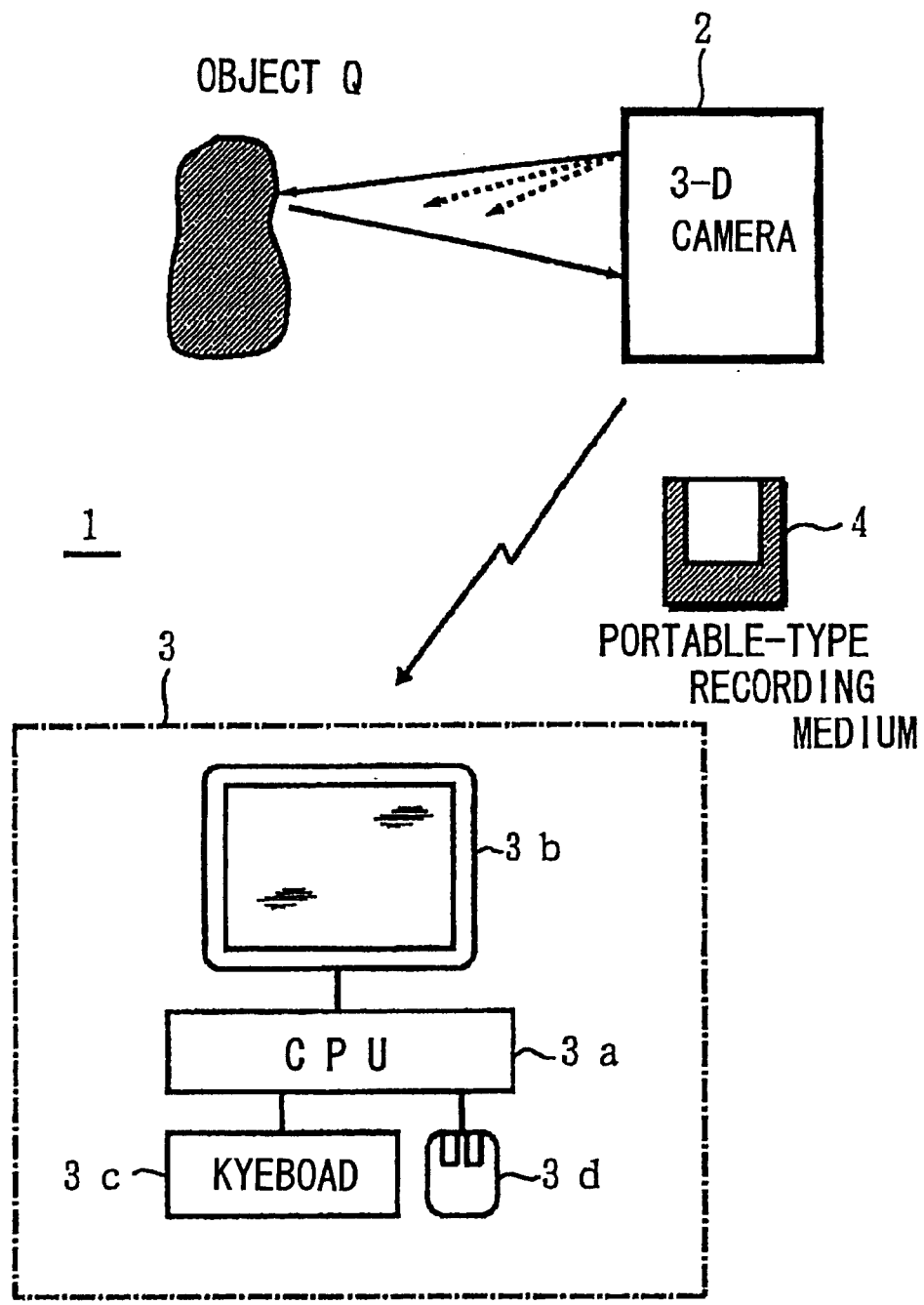
FIG. 1 shows the structure of the measuring system of the present invention.

FIG. 1 shows the structure of the measuring system 1 of the present invention.

The measuring system 1 comprises a three-dimensional camera (rangefinder) 2 for performing three-dimensional measurement by slit-light projection method, and a host 3 for processing data output from the three-dimensional camera 2.

The three-dimensional camera 2 outputs measurement data of sampling points on object Q which is the measurement target, and outputs a two-dimensional image representing color information of the object Q and data required for calibration. The host performs calculation processing to determine the coordinates of the sampling points using a triangulation method.

The host 3 is a computer system comprising a CPUa, display 3b, keyboard 3c, and mouse 3d. Software for processing measurement data are integrated in CPU 3a. two forms of data transfer are possible between the host 3 and the three-dimensional camera 2, i.e., online data transfer by cable or infrared communicaiton, and offline data transfer by a portable-type recording medium 4. The recording medium 4 may be an magneto-optic disk (MO), mini disk (MD), memory card or the like.

Figure 2:
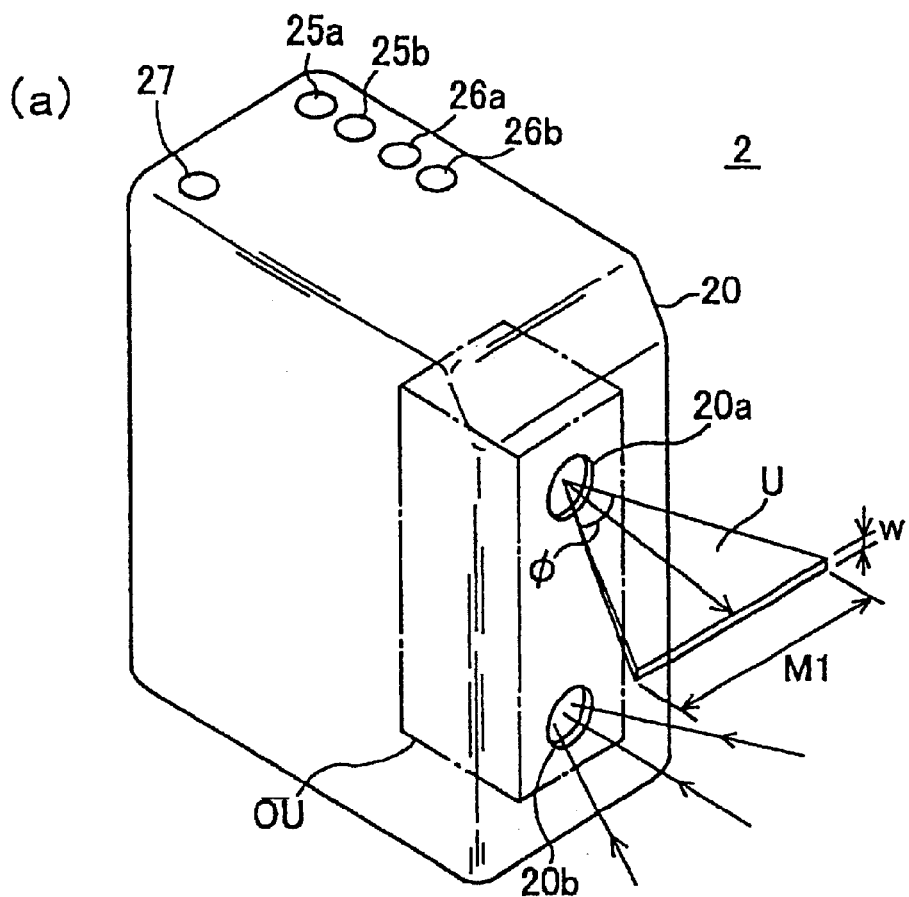
FIG. 2 shows an exterior view of a three-dimensional camera.
Figure 2:
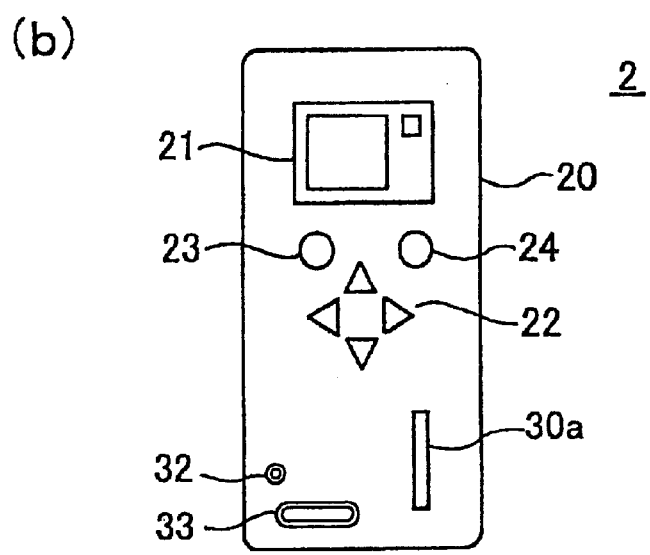

FIG. 2 shows an exterior view of the three-dimensional camera.

On the front surface of the housing 20 are provided a light projection window 20a and a light receiving window 20b. The light projection window 20a is positioned above the light receiving window 20b. A slit light (band-like laser light of a specific width w) U emitted from an internal optical unit OU passes through the light projection window 20a toward the measurement target object (photographic subject) Q. The radiation angle$\phi$ in the length direction M1 of the slit light U is fixed. The slit light U0 emitted from the semiconductor laser (LD) 41 is formed by rapid deflection in the main scan direction X (length direction M1). Part of the slit light U reflected from the surface of the object Q passes through the light receiving window 20b and enters the optical unit OU. The optical unit OU is provided with twin-axial adjustment mechanism to correct the relative relationship between the light projection axis and the light reception axis.

The spot light is defined as the reference light projected to a relatively small region, e.g., includes the a rather long slit-like reference light in the main scan direction.

On the top surface of the housing 20 are provided zoom buttons 25a and 25b, manual focus buttons 26a and 26b, and a shutter button 27. As shown in FIG. 2(b), on the back surface of the housing 20 are provided a liquid crystal display 21, cursor button 22, selection button 23, cancel button 24, analog output pin 32, digital output pin 33, and the installation slot 30a for the recording medium 4.

The liquid crystal display (LCD) 21 is used as a display means for the operation screen and as an electronic finder. The photographer can set the photographic mode by the buttons 21–24 on the back surface. Color image signals are output from the analog output pin 32 in, for example, NTS format. The digital output pin 33 is, for example, a SCSI pin.

The user (photographer) sets the desired operation mode in accordance with guidance on the operation screen displayed on the LCD 21.

Thereafter, while viewing the color monitor image, the camera position is determined, and the angle of field is set. Zoom lens operation occurs as necessary at this time.

Figure 3:
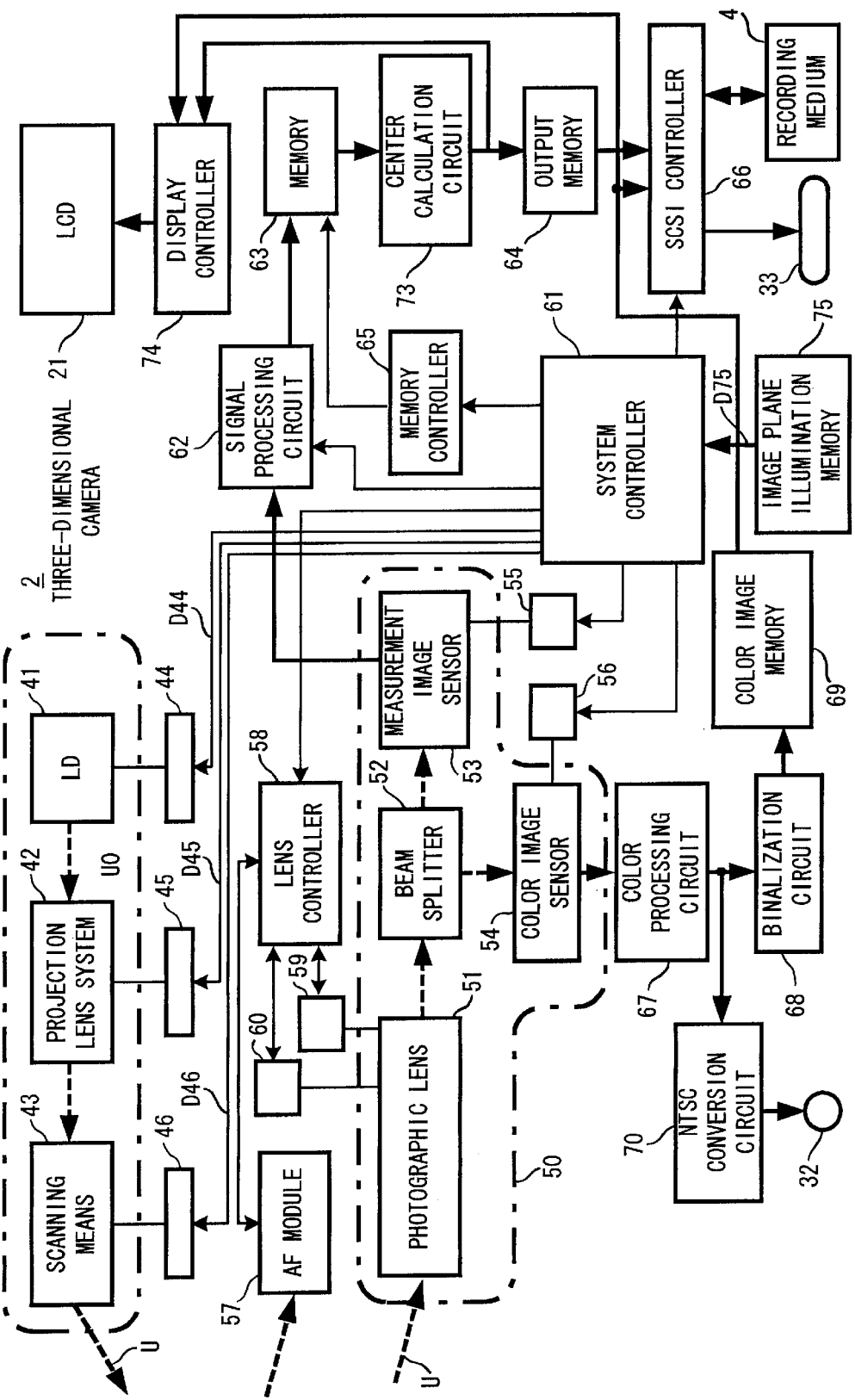
FIG. 3 is a block diagram showing gth4e functional structure of the three-dimensional camera.

FIG. 3 is a block diagram showing the functional structure of the three-dimensional camera. The solid line arrow in the drawing represents the electrical signal flow, and the dashed line arrow represents the light flow.

The three-dimensional camera 2 has a projection light optical system 40 and photographic system 50 comprising the previously mentioned optical unit OU.

In the projection light optical system 40, a laser beam (spot light U0) having a wavelength of 685 nm emitted from the semiconductor laser 41 passes through the projection lens system 42, and thereafter is deflected by the scanning means (galvano mirror) 43 and becomes the slit light U. The driver 44 of the semiconductor laser 41, the drive system 45 of the projection lens 42, and the drive system of the scanning means 43 are respectively controlled by spot light control data D44, projection lens control data 45, and deflection angle control data 46 output from the system controller 61.

In particular, the system controller 61 changes the intensity of the light emitted from the semiconductor laser 61 by outputting spot light control data D44 to the driver 44 based on the image plane illumination ratio data D75 in accordance with the deflection by the scanning means 43.

That is, the image plane illumination ratio data D75 are stored in the image plane illumination ratio memory 75. The image plane illumination ratio data D75 are data representing the difference in image plane illumination on the image sensor 53 dependent on the optical characteristics of the projection system 40. The image plane illumination ratio data D75 is determined beforehand for a plurality of photographic conditions and stored in the image plane illumination, ratio memory 75. This storage of data is performed because the image plane illumination ratio changes depending on the photographic conditions. The plurality of photographic conditions may be, for example, a plurality of different angles of field of the photographic lens 51, plurality of different image sensing distances (focusing lens state), e.g., distance between a representative area of the object Q and the three-dimensional camera 2, plurality of different stops, and the like. Although the image plane illumination ratio data D75 may be stored for each pixel, the image sensing surface may be divided into blocks and representative values may be stored for block units so as to reduce memory capacity. The system controller 61 reads corresponding image plane illumination ratio data D75 from the image illumination ratio memory 75 in accordance with the angle of field of the photographic lens, image sensing distance, and stop condition during photography, and modulates the output of the semiconductor laser 41 based on the read data. In this way the intensity of the spot light U is changed in accordance with the deflection of the spot light U. Details are described later.

In the photographic system 50, the light converged by the photographic lens 51 is divided by the beam splitter 52. The light of an oscillating wavelength band emitted from semiconductor laser 41 enters the measurement image sensor 53. The visible band light enters the monitor color image sensor 54. The image sensor 53 and the color image sensor 54 may be CCD image sensing devices. Since autofocusing (AF) is accomplished by the photographic lens 51 the AF module 57 used for optical distance measurement is arranged near the photographic lens 51. The lens controller 58 controls the focus drive system 59 based on the distance data output by the AF module 57. The zoom drive system 60 is provided for dynamic zoom.

The flow of object information and the three-dimensional camera 2 is described below.

First, photographic information obtained by the image sensor 53 is transmitted to the signal processing circuit 62 synchronous lay with clock signals from the driver 55. The signal processing circuit 62 is provided an amplifier for amplifying photo electric conversion signals of each pixel output by the image sensor 53, and an analog to digital converter for converting these photoelectric conversion signals to 8 bit photoreception data. The photoreception data obtained by the signal processing circuit 62 a temporarily stored in the memory 63, and thereafter transmitted to center calculation circuit 73. The center calculation circuit 73 calculates data used as a basis for calculating three-dimensional position based on the input photoreception data, and outputs these data to output memory 64. These center calculation circuit 73 generates a variable density image (distance image) corresponding to the shape of the object being the measurement target, and transmits the image data to the display controller 74. The LCD 21 displays the variable density image, color image, and operation guide screen and the like. The system controller 61 issues instructions to a character generator not shown in the drawing to display suitable text and symbols on the screen of the LCD 21.

On the other hand, photographic image information obtained by the color image sensor 54 is transmitted to a color processing circuit 67 synchronous lay with clock signals from driver 56. The color processed image information are output online through the NTSC conversion circuit 70 and the analog output and 32, then binarized by the binarization circuit 68 and stored in the color image memory 69. Thereafter, the color image data are transferred from the color image memory 69 to the SCSI controller 66, and output online from the digital output pin 33, or stored on recording medium 4 appended to the measurement data.

The color image is an image of same angle of field as the distance image obtained by the image sensor 53, and is used as reference information for application processing in host 3. Processes using the color image are, for example, processes generating a shape model by combining measurement data of a plurality of groups from different camera points of view, and processes culling peak points unnecessary to the shape model.

Figure 4:
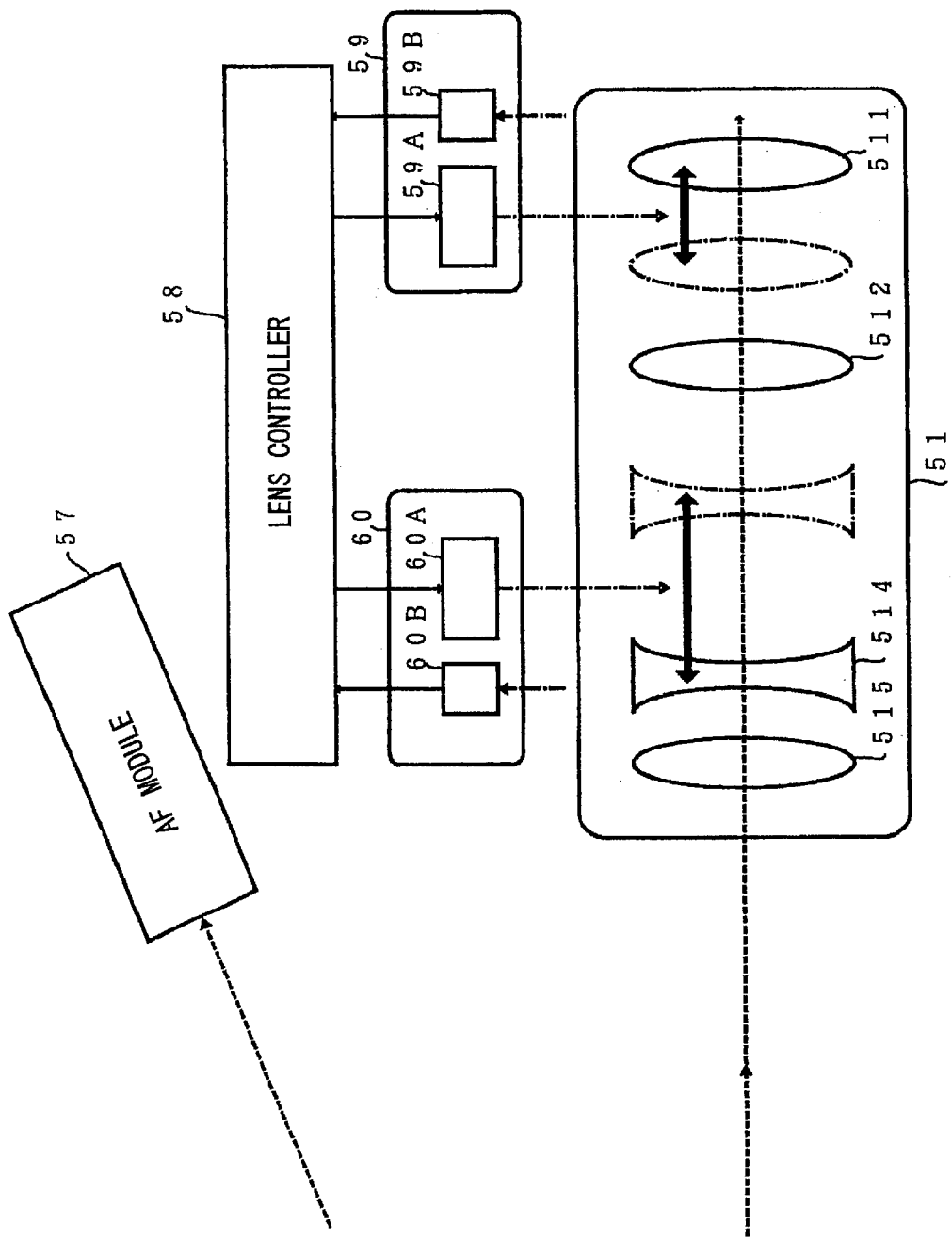
FIG. 4 shows the structure of the photographic lens.

FIG. 4 shows the construction of the photographic lens.

The photographic lens 51 comprises a front focus lens 515, variater lens 514, focusing glens 511, and back fixed lens 512. The variater lens 514 and the focusing lens 511 are mutually and independently movable along the optical axis. In this way zooming is possible.

The movement of focusing lens 511 is handled by the focus drive system 59. The focus drive system 59 is provided with a post motor 59A for driving the lens, and an origin point switch 59B for detecting the origin position. The focusing lens 511 moves only a distance corresponding to the amount of rotation of pulse motor 59A using the point of operation of origins switch 59B as reference. The movement of the variater lens 514 is managed by the zoom drive system 60. The zoom drive system 60 is provided with a pulse motor 60A for driving the lens, and origin point switch 60B for detecting the origin position. The variater lens 514 moves only a distance corresponding to the amount of rotation of the pulse motor 60A using the point of operation of origin switch 60B has reference.

Figure 5:
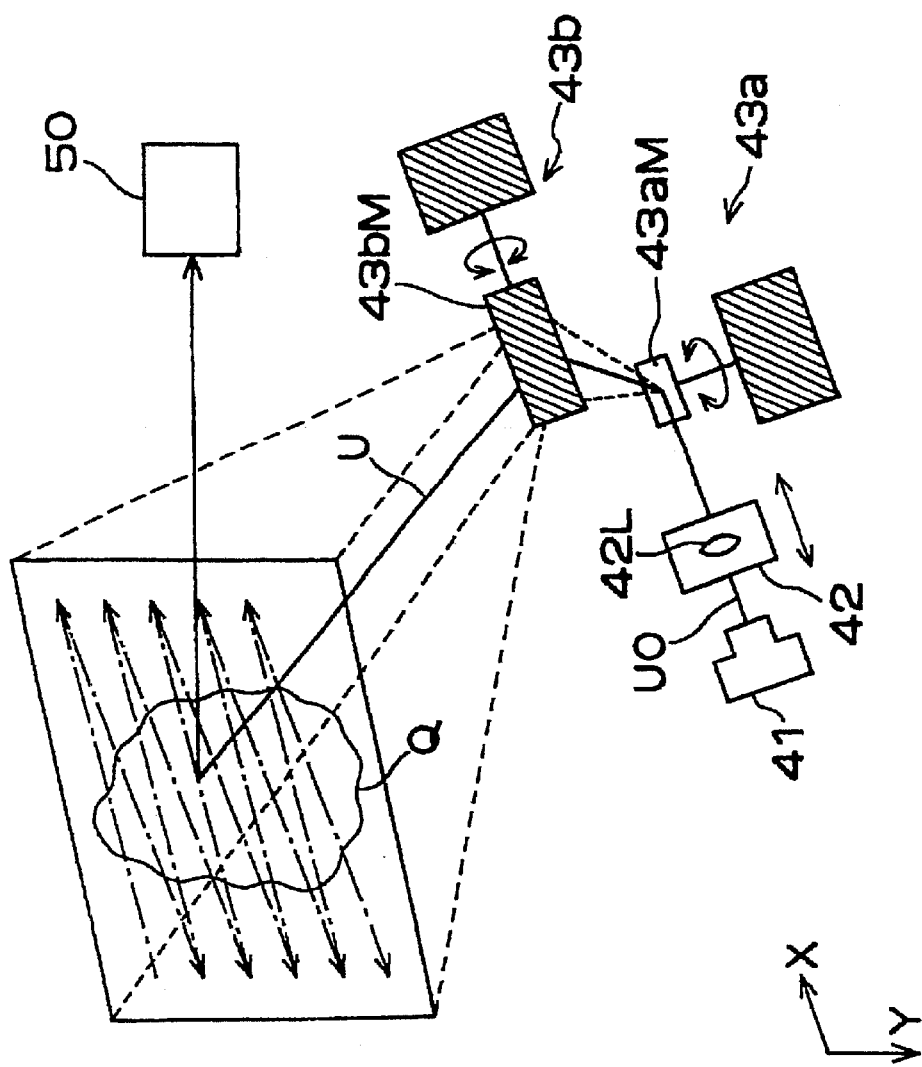
FIG. 5 illustrates the structure of the scanning means and scanning of an object by slit light.

FIG. 5 shows the structure of the projection optical system and illustrates the scanning of an object by the spot light. If In FIG. 5, the X-direction is the main scan direction, Y-direction is to sub scan direction. The scan means 43 comprises a main scan means of galvano mirror 43a, and sub scan means of galvano mirror 43b. The galvano mirror is 43a and 43b comprise mirror is 43aM and 43bM which reflect spot light U0, and the drive systems for rotating these mirrors.

The spot light U0 emitted from semiconductor laser 41 passes through projection lens system 42 and becomes a broadened outward directed parallel beam. These beams are reflected by mirror is 43aM. and 43bM, and a directed toward the object Q. and ovoid spot light illuminates the surface of the object Q.

The lens 42L of the projection lens system 42 is movable and the optical axis direction, and the size of the cross section of the spot light U0 is adjustable by changing the position of the optical axis direction of the lens 42L.

The galvano mirror 43a deflects spot light U0 at high speed in the X-direction. In this way slit-like tracking is performed standing in the X-direction. A slit-like laser beam, i.e., slit light U is formed by oscillating mirror 43aM for a sufficiently short period during photography. In the photographic system 50, tracking of the image is viewed in slit light U.

The galvano mirror 43b deflects slit light U in the Y-direction at a speed relatively slower than the speed of deflection by the galvano mirror 43a. In this way the surface of the object Q is scanned by the slit-like track in the Y-direction. In the photographic system 50, the slit light is seen as scanning the surface of the object Q.

The scanning speed of the galvano mirrors 43a and 43b is adjusted so as to optimally scan the object Q corresponding to the angle of field of the photographic lens 51.

The control operation for changing the intensity of the slit light U0 in accordance with deflection is described below.

In the three-dimensional camera 2, a preliminary measurement is performed prior to the main measurement for input of measurement data. In the preliminary measurement, only representative positions (e.g., center area) are measured for consideration of the existence of an object. The system controller 61 sets the amplification factor in the signal processing circuit 62 in the integration time of the image sensor 53, and the intensity of the slit light U0 such that the center area of the light receiving surface (image sensing surface) S2 of the image sensor 53 receives suitable image plane illumination (exposure) based on the preliminary sensed image. The intensity of spot light U0 set in this way is set at V0. The image distance is measured at this time.

The image plane illumination ratio data D75 corresponding to the sensing distance in the angle of the received light during preliminary measurement are read from the image plane illumination memory 75. The main measurement is described below.

The system controller 61 calculates projection lens control data D45 are calculated to optimize the size of the spot light U0 based on the sensing distance handy angle of light received during the preliminary measurement. The deflection angle control data D46 are calculated for controlling the deflection angle of the scanning means 43 in the X-direction and the Y-direction. Spot light control data D44 are calculated at positions of each deflection angle of the scanning means 43 in the X-direction and the Y-direction based on the read image plane illumination data D75. Then, the main measurement is performed by controlling the scan of the object Q by the spot light U0 and the intensity of the emitted light from the semiconductor laser 41 based on each of the aforesaid control data.

Since the spot light U0 is collimated so as to broaden in an outward facing direction as described above, the size of the cross section of the spot light U0 increases on the object Q as the image sensing distance increases. However, the size of the formed image remains approximately equal regardless of the image sensing distance because the image formed on the image sensor 53 becomes smaller only to the degree that the object is farther. That is, a slit image of suitable with is normally obtained even though the image sensing distance changes. The width of the slit image may be set at three to five pixels to improve accuracy of the position calculation of the slit image.

The method of calculating the intensity of the spot light U0 corresponding to the deflection position is described below.

Figure 6:
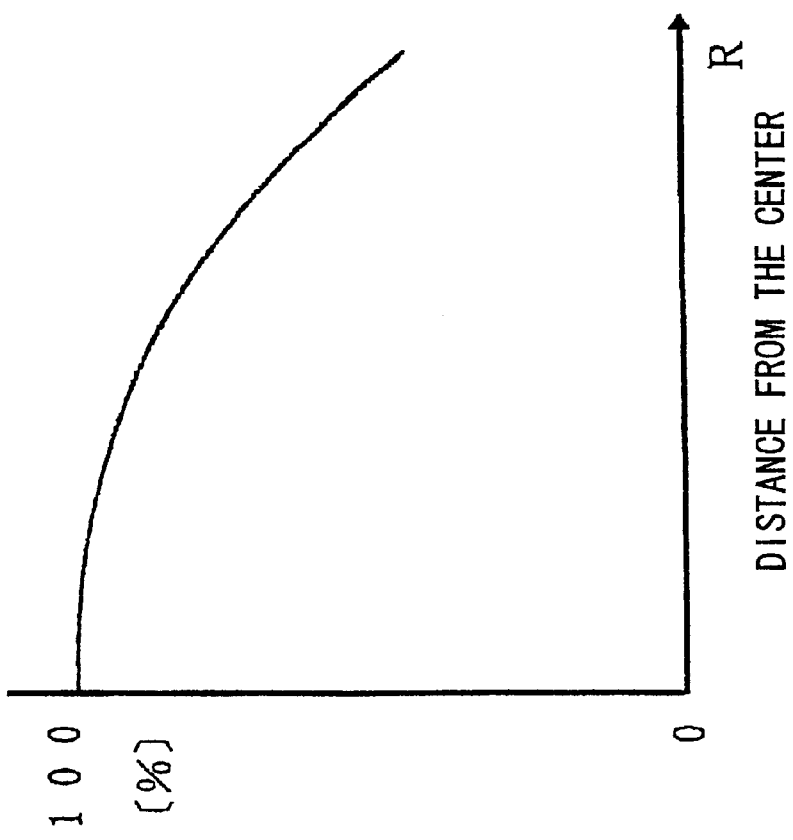
FIG. 6 shows an example of the relationship between the distance from the center of the image sensor and the image plane illumination ratio.
Figure 7:
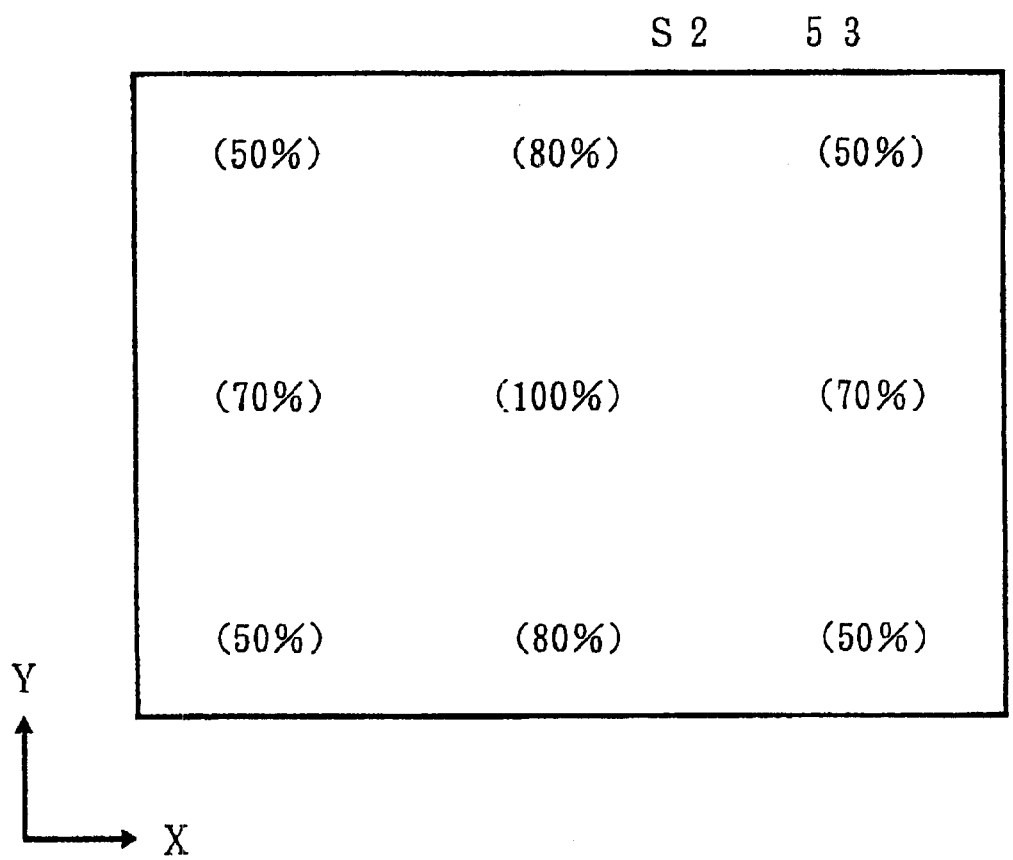
FIG. 7 shows an example of the image plane illumination ratio on the image sensor.

FIG. 6 shows an example of the relationship between the image plane illumination ratio and the distance from the center area of the image sensor, and FIG. 7 shows an example of image plane illumination ratio on the image sensor.

FIGS. 6 and 7 show the image plane illumination ratio at once specific angle of field, image sensing distance, and apertures state after the preliminary measurement. The image plane illumination ratio is represented by 100 percent relative to the center P0. In this example the image format of the photographic lens 51 is ½ inch, in the aspect ratio of the light receiving surface S2 of the image sensor 53 is 3:4.

As shown in FIG. 6, and the light receiving surface S2 of the image sensor 53, the image plane illumination is highest in the center area P0, any image plane illumination diminishes in accordance with the magnitude of the distance R from the center area P0.

In the example shown in FIG. 7, the image plane illumination ratio is 80 percent in the center area from the vertical margins, 70 percent in this center area from the lateral margins, and 50 percent at the four corners.

The emission intensity of the semiconductor laser 41 is controlled such that the intensity of the spot light U0 received each position on the light receiving surface S2 is proportional to the reciprocal of the image plane illumination ratio at these positions.

Accordingly, and the above example, the intensity of spot light U0 at this center point P0 is approximately 1.25 times (=100/80) at this center area from the vertical margins, approximately 1.43 times (=100/70) at this center area from the lateral margins, and approximately two times (=100/50) at the four corners. That is, the light intensity of each area becomes a value obtained by multiplying the reciprocal of the image plane illumination ratio by the intensity V0 of the center area set by the preliminary measurement. This value is equivalent to the product of the image plane illumination ratio and intensity of the spot light U0 in the main measurement producing a constant value V0. Although controlled so as to maintain a constant value, there is old need not necessarily be a strictly constant value.

Controlling the intensity of the spot light U0 is accomplished at all sampling points on the light receiving surface S2. As described above, the image plane illumination ratio differs depending on the angle of field of the photographic lens 51, the image sensing distance, and stop condition, such that image plane illumination ratio data D75 corresponding to photographic conditions are used during photography.

The method of controlling the emission intensity of the semiconductor laser 41 is described below.

The method of controlling the emission intensity is described in terms of the method wherein the intensity is changed while the spot light U0 is projected continuously (intensity modulation), and a method wherein spot light U0 is intermittent to the projected, and controlled during the ON time (pulse width modulation).

Figure 8:
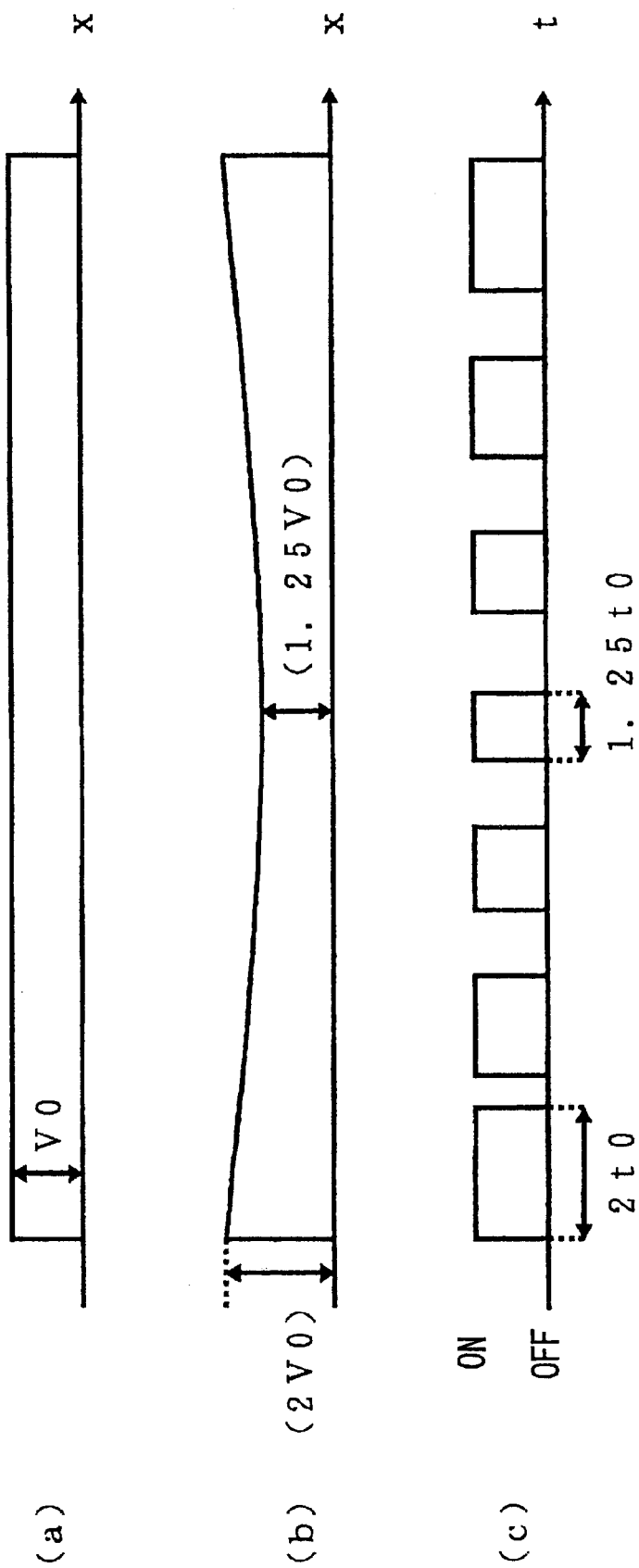
FIG. 8 illustrates a method of changing the spot light intensity.

FIG. 8 illustrates a method of changing the intensity of the spot light. FIG. 8(b) shows an example of one scan line in the upper area of the light receiving surface S2 during intensity modulation; FIG. 8(c) shows an example of one scan line in the upper area of the light receiving surface S2 during pulse width modulation. FIGS. 8(a) hand 8(b) show the emission intensity of the semiconductor laser 4, wherein the horizontal axis represents the position along the main scan direction X of the light receiving surface S1. In FIG. 8(c), the vertical axis to represents the ON/OFF state of the semiconductor laser 41, and the vertical axis represents time.

As shown in FIG. 8(b), in the intensity modulation, the semiconductor laser 41 is turned on during the main scan., and the output is variable while proportional to the inverse of the image plane illumination ratio.

As shown in FIG. 8(c), in the pulse width modulation, the semiconductor laser 41 is interrupted 40 fixed period, and the ON time of the semiconductor laser 41 is controlled such that the intensity is proportional to the inverse of the image plane illumination ratio.

During pulse width modulation, the pulse period is simultaneously variable, so as to be an element of frequency modulation.

Since, in this way, the emission intensity of the semiconductor laser 41 changes in accordance to the deflection of the been so as to maintain constant the product of the intensity of the spot light U0 and the image plane illumination ratio, the image illumination that an age produced by the spot light U0 is a suitably constant value overhaul the area receiving light and the light receiving surface S2 of the image sensor 53. Therefore, accurate measurement data are obtainable for the entire sensed image on the light receiving surface S2.

Moreover, since it is unnecessary normally to monitor the amount of light received by conventional method, high-speed photoreceptive element and high-speed feedback control system are not required.

The image plane illumination ratio data D75 may be stored in raw form the image plane illumination ratio memory 75, or may be stored in the processed state. For example, the inverse of the image plane illumination ratio may be saved in memory has data. When the reflectivity of an object Q is known before hand, the intensity of the semiconductor laser 41 acting in this center area may be multiplied before hand, so as to directly stored modulation data for the semiconductor laser 41 in accordance with deflection.

Figure 9:
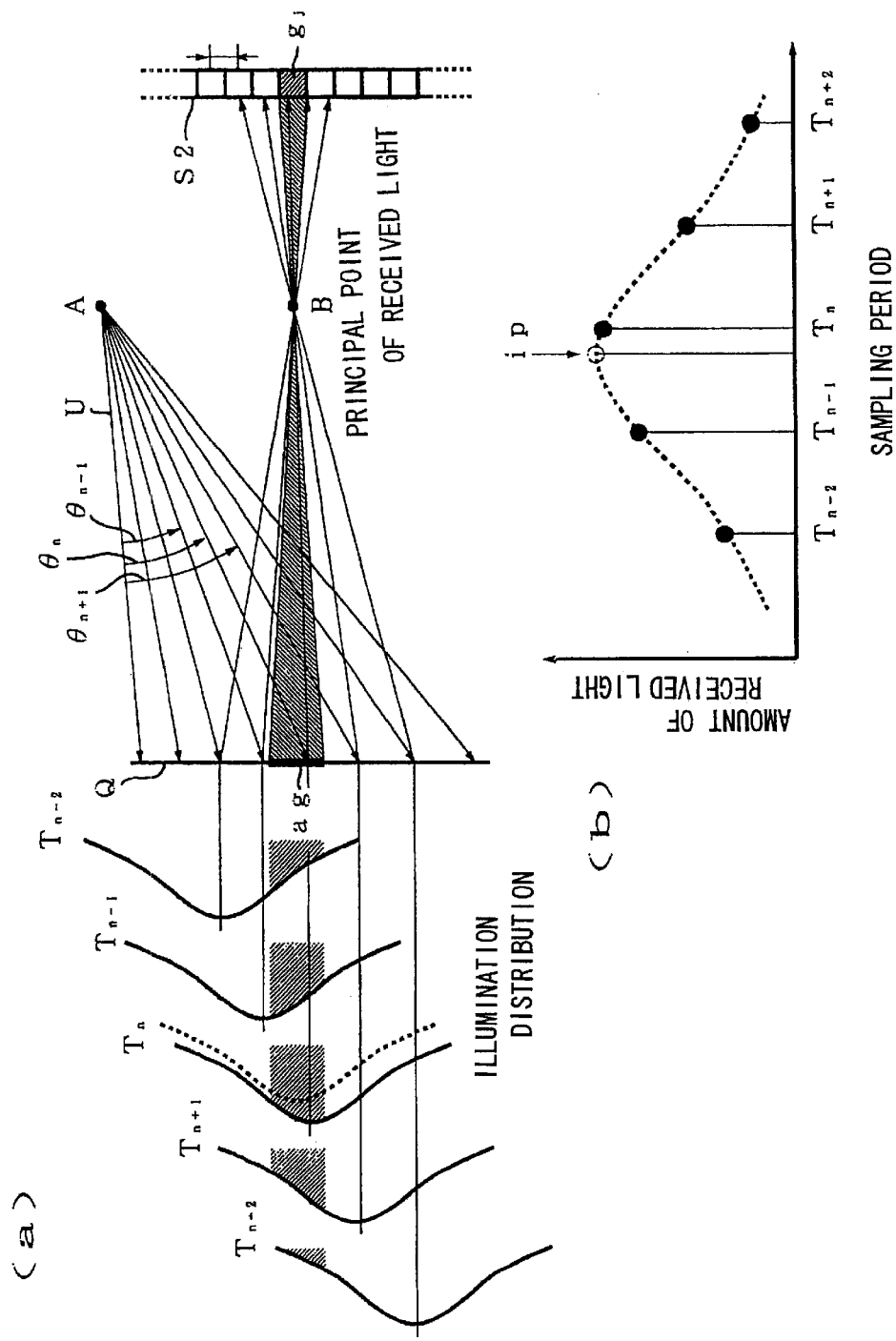
FIG. 9 is a theoretical illustration of the calculation of a three-dimensional position by the measuring system.

FIG. 9 is a theoretical illustration of the calculation of the three-dimensional position in the measurement system. As can be readily understood from the drawing, there five samplings of the amount of received light for each pixel g.

The three-dimensional input apparatus 1 projects a slit light U to the object Q. This slit light U is received by a plurality of individual pixels g array 8 with a pitch pv on the light receiving surface S2 of the image sensor 53, and is a relatively broad slit light. Specifically, the slit light U has a width of approximately three to five pixels on the light receiving surface S2. This slit light U is deflected at equi-angular speed in a vertical direction about and origin point A. The slit light U reflected by the object Q passes through a principal point B (zoom back side principal point) of image formation, and enters the light receiving surface S2 of the image sensor 53. The object Q (strictly speaking, a hypothetical surface intersecting the depth direction) is scanned by periodically sampling the amount of light received by each pixel g of the light receiving surface S2 during projection of the slit light U. Photoelectric conversion signals of one frame are output from the image sensor 53 each sampling period.

When a single pixel g is targeted on the light receiving surface S2, in the present embodiment, photoreception data are obtained 32 times by 32 samplings during the scan. The time center ip is calculated by a centering calculation performed on these 32 samplings of photoreception data.

The time center ip is the point in time the optical axis of the slit light U passes through the center of a range of the object surface in which the target pixel g resides.

When the surface of the object Q is flat and characteristics of the optical system to not produce noise, the amount of light received by the target pixel g is greater in the period during which the slit light U passes through, as shown in FIG. 9(b), and normally follows the standard distribution curve. In the example shown in FIG. 9, the amount of light received attains the maximum between the time Tn of the No. n sample and the time Tn−1 of the previous sample (n−1), and the time center ip calculated from these times matches. The entrance angle of the slit light U relative to each pixel g is unambiguously determined from the positional relationships of the principal point B and each pixel g of the light receiving surface S2. Accordingly, the time center can be said to be "the moment the slit light U enters the principal point B at a specific angle".

The position (coordinates) of the object Q are calculated based on the relationship between the direction of illumination of the slit light U at the determined center ip and the entrance direction of the slit light U on the target pixel. In this way, measurement is possible at higher resolution than a standard resolution at the pitch pv of the pixels on the light receiving surface. the amount of light received by the target pixel g is dependent on the reflectivity of the object Q. However, the relative ratio of the amount of light of the samplings is constant regardless of the absolute amount of light received. That is, the variable density of the object color does not affect measurement accuracy.

Figure 10:
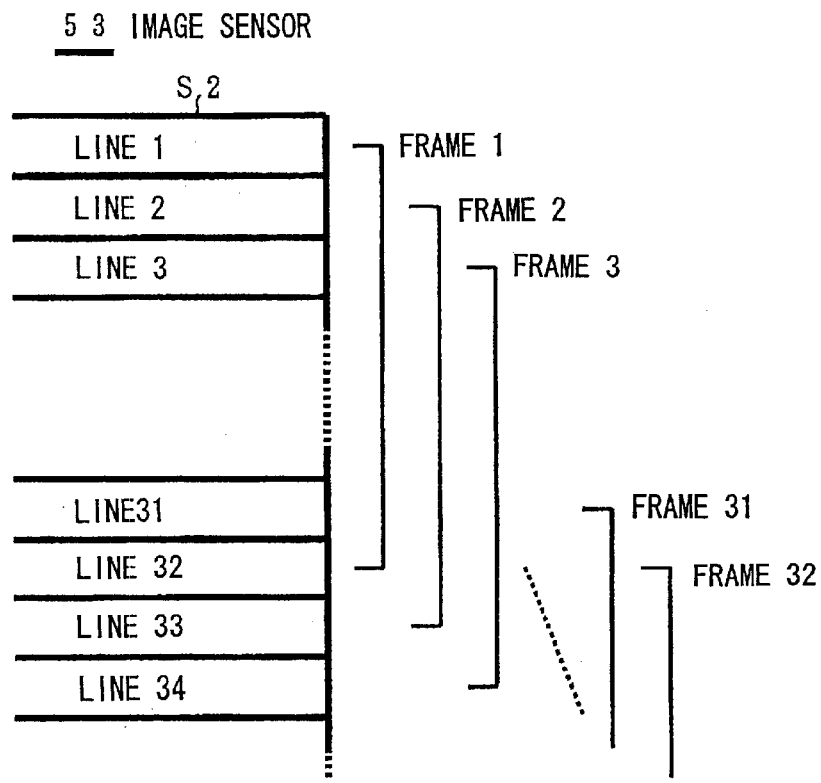
FIG. 10 illustrates the relationship between the line and frame on the photoreceptor surface of the image sensor.
Figure 10:
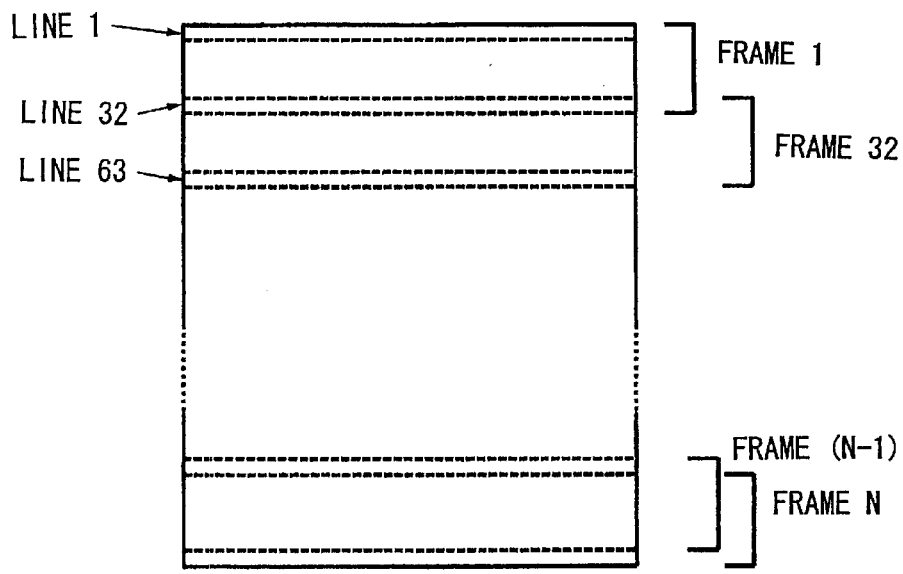

FIG. 10 illustrates the relationship between the frame and line on the light receiving surface of the image sensor.

Reading one frame of the image sensor 53 is accomplished not by targeting the entirety of the light receiving surface S2, but by targeting only the band-like effective light receiving region of part of the surface in the subscan direction to attain high speed. The effective light receiving region is the region wherein an image is formed by a luminance line representing a projection on the object within the measurable distance range, and is shifted one pixel at a time for each frame in accordance with the deflection of the slit light U. The number of pixels in the shift direction of the effective light receiving region is fixed at 32, and the number of pixels in the length direction (horizontal direction) is selected at, for example, 200.

As shown in FIG. 10, the photoreception data of 32 lines from the top line 1 to line 32 are included in the first frame of the light receiving surface S2. Each frame is shifted 1 line, such that the frame 2 includes line 2 to line 33, and frame 3 includes line 3 to line 34. Frame 32 includes 32 lines from line 32 to line 63.

The photoreception data for frames 1 through 32 are sequentially transferred and stored in the memory 63 via the signal processing circuit 62. That is, the photoreception data of frames 1, 2, 3 and the like are stored sequentially in the memory 63. The data of line 32 which is the top line of the sampling range is shifted upward line by line for each frame and stored as the 32nd line of frame 1, and the 31st line of frame 2. When the photoreception data from frame 1 to frame 32 are stored in the memory 63, the time center ip is calculated for each pixel of line 32. The photoreception data of frame 33 is transferred and stored in memory 63 during the calculation for line 32. The photoreception data of frame 33 is stored at the next address in the memory 63. When the data of frame 33 are stored in memory 63, the time center ip is calculated for each pixel of line 33 included in frame 2 through frame 33.

Figure 11:
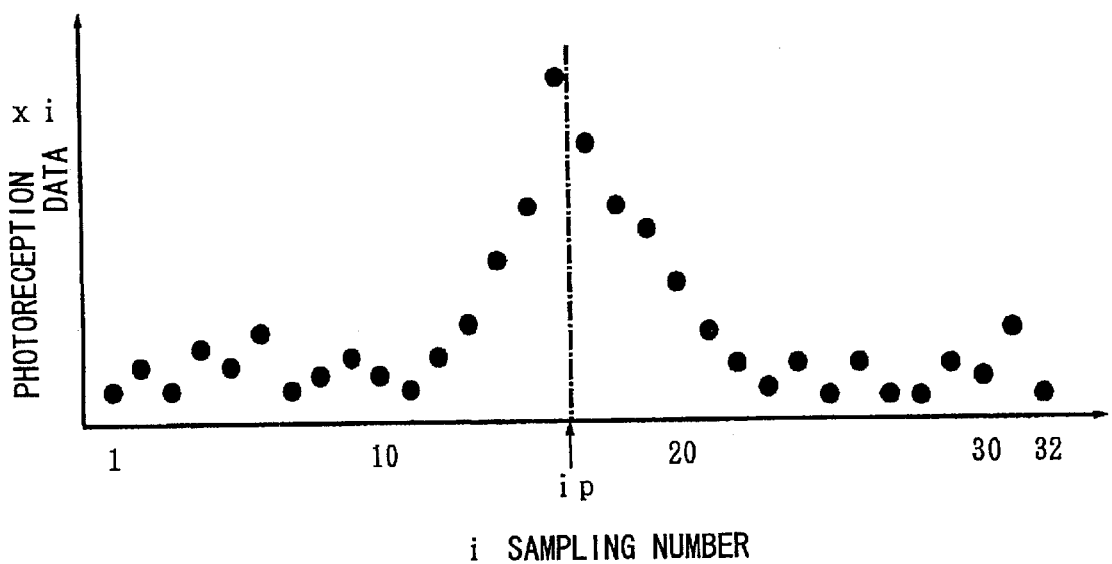
FIG. 11 illustrates the concept of time centering.

FIG. 11 illustrates the concept of time centering.

The time center ip calculated by the center calculation circuit 73 is the center on the time axis for the photoreception data of 32 time series obtained by 32 samplings. 1~32 sampling numbers are appended to the 32 photoreception data of each pixel. The No. i photoreception data is represented as xi, where i is an integer of 1~32. At this time, i represents the frame number of a single pixel in the effective light reception range.

The time center ip of the Nos. 1~32 photoreception data x1~x32 is determined by dividing the total sum Σi·xi of i·xi by the total sum Σxi of xi for the 32 photoreception data.

The center calculation circuit 73 calculates the time center ip of each pixel based on the data read from the memory 63. The data read from the memory 63 are not used directly, but rather the values used are calculated by subtracting routine data from the read data (this value becoming 0 when negative). That is, the photoreception data output from the image sensor 53 are offset by deducting the regular data.

The calculated time center ip is sequentially stored in memory within the display controller, and displayed on the screen of the LCD 21. The value of the time center ip is large when the position of the surface of the object Q is near the three-dimensional camera 2, and small when the surface of the object Q is far from the camera 2. Accordingly, the distance distribution of the measurement result can be visualized by displaying a variable density image using the time center ip of each pixel of the light receiving surface S2 as density data.

In the centering calculation, when the output of the image sensor 53 is saturated, the photoreception data is constant before and after the center position, and an accurate center cannot be determined. In the present embodiment, since the intensity of the laser light is normally controlled to a suitable intensity, the output of the image sensor 53 does not become saturated, and the aforesaid problem does not occur.

Although the centering calculation has been described in the present embodiment, the centering calculation need not be performed inasmuch as the timing (Tn of FIG. 9) of a detected peak may be simply measured as the pass-through time point. In this case, when the output of the image sensor 53 is saturated, the photoreception data before and after Tn become constant, such that the peak timing cannot be determined; however, because the intensity of the laser light is normally controlled to a suitable intensity in the present embodiment, the output of the image sensor 53 does not become saturated and this problem does not occur.

Although the present embodiment is constructed such that the timing of the passage of the slit light U image is determined by the center calculation, the position of the slit light image may be determined by a center calculation as disclosed in Japanese Laid-Open Patent No. 7-174536, and applied to the present invention.

Since the intensity of the slit light U0 is variable in accordance with the image plane illumination distribution ratio characteristics of the photographic system 50 in the present embodiment, a suitable image plane illumination is obtained at all areas of the light receiving surface S2 of the image sensor 53, thereby allowing accurate measurement of the three-dimensional shape of the object Q. Furthermore, by storing in memory beforehand the image plane illumination ratio data D75 corresponding to various conditions, these data correspond to various angles of field of the photographic lens 51, as well as various image sensing distances and stop conditions.

The stored data need not be the image plane illumination ratio data D75. If data representing the image plane illumination distribution are used, the data may be in various forms. The present invention is also applicable to three-dimensional input apparatuses using various area-type photosensors other than the aforementioned image sensor 53, e.g., area-type position sensor (PSD) and the like.

The structure, form, arrangement, circuits, processing modes and the like of the measuring system 1 and the three-dimensional camera 2 may be suitably modified in whole or in part pursuant with the scope of the present invention.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An apparatus for obtaining data relating to the three-dimensional shape of an object, said apparatus comprising:

a controller for controlling a light beam;

a scanning system for scanning an object by the controlled light beam;

an image receiving system for receiving the light beam reflected from the object in a prescribed range; and a memory for storing data for correction of illumination irregularities corresponding to positions in said prescribed range, wherein the controller refers to the stored data according to the position where the reflected beam received by said image receiving system with referring to the stored data.

2. The apparatus according to claim 1, wherein the image receiving system includes an image sensor and a photographic lens for translating the light beam reflected from the object and directing the light beam to the image sensor; and wherein said illumination irregularities due to unevenness of an optical characteristics of the photographic lens with respect to the position.

3. The apparatus according to claim 1, wherein the image receiving system includes an image sensor comprising a plurality of pixels arranged two-dimensionally, the image sensor being divided into blocks which includes a plurality of pixels therein, and wherein each of the positions correspond to each of blocks.

4. An apparatus for receiving the light reflected by an object, said apparatus comprising:

a light source for emitting light;

a deflecting mechanism for deflecting the emitted light to scan an object;

a lens system for translate the light reflected by the object;

a sensor for receiving the translated light;

a memory for storing data dependent on an optical characteristics of the lens system; and a controller for controlling the emission of light in proportion to the deflection of light with referring to the data.

5. The apparatus according to claim 4, wherein the apparatus obtains information relating to the three-dimensional shape of the object from the received light.

6. The apparatus according to claim 4, wherein the sensor is a two-dimensional area sensor.

7. The apparatus according to claim 4, wherein the light source emits a spot light, and the deflection mechanism scans the spot light two-dimensionally.

8. The apparatus according to claim 4, wherein the controller controls the intensity of the emission of the light.

9. The apparatus according to claim 4, wherein the light source repeats a light emission of a predetermined time, and wherein the controller controls the predetermined time.

10. The apparatus according to claim 4, wherein the light source emits the light periodically, and wherein the controller controls the periodic time of the emission.

11. The apparatus according to claim 4, wherein the data corresponds to distances from the apparatus to the object.

12. The apparatus according to claim 11, further comprising:

a range finder for measuring the distance from the apparatus to a point on the object, and wherein the controller refers the data corresponding to the measured distance.

13. The apparatus according to claim 4, wherein the lens system includes a zoom lens, and the data corresponds to a zooming by the zoom lens.

14. The apparatus according to claim 4, wherein the controller controls the emission of the light such that the sensor receives an approximately constant amount of light through the deflection.

15. The apparatus according to claim 4, wherein the data includes a reciprocal distribution of an illumination distribution of lens system depending on a optical characteristics thereof.

16. A method for obtaining three-dimensional shape data of an object, said method comprising the steps of:

emitting light;

scanning an object with deflecting the emitted light in a predetermined range by a deflector; and receiving the light reflected from the object at light receiving positions along with the scanning of said scanning step, wherein the light emission of said emitting step is controlled in accordance with information representing a light receiving characteristics at each of the light receiving positions.

17. The method according to claim 16, wherein the information is provided for an optical path length from the object to the light receiving portion.

18. The method according to claim 17, wherein the information is provided for the deflecting range.

19. The method according to claim 17, further comprising:

a step of measuring the optical path length before aforesaid steps.

* * * * *